Nov. 20, 1956　　　　　M. REISNER　　　　2,770,816
CUSHIONS AND METHOD OF MAKING THE SAME
Filed Sept. 6, 1955　　　　　　　　　　3 Sheets-Sheet 1
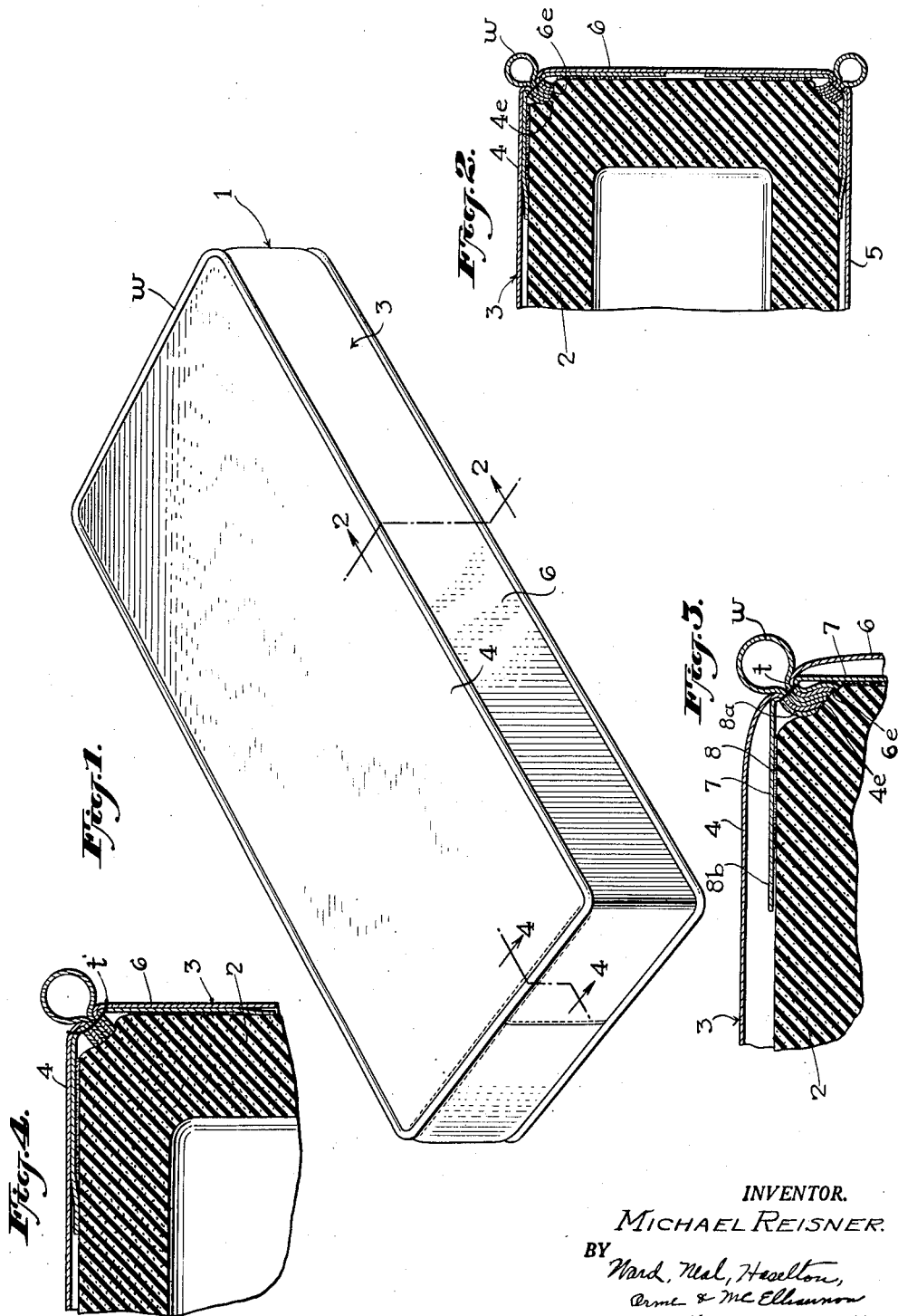
INVENTOR.
MICHAEL REISNER.
BY Ward, Neal, Hazelton,
Orme & McElhannon
his ATTORNEYS.

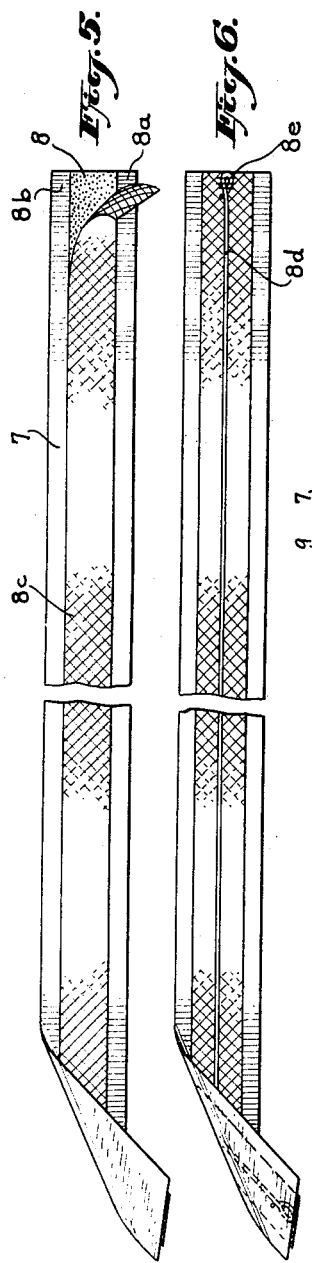
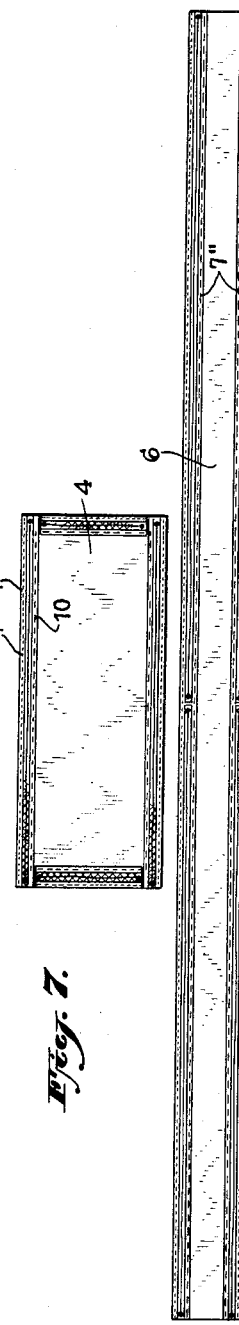
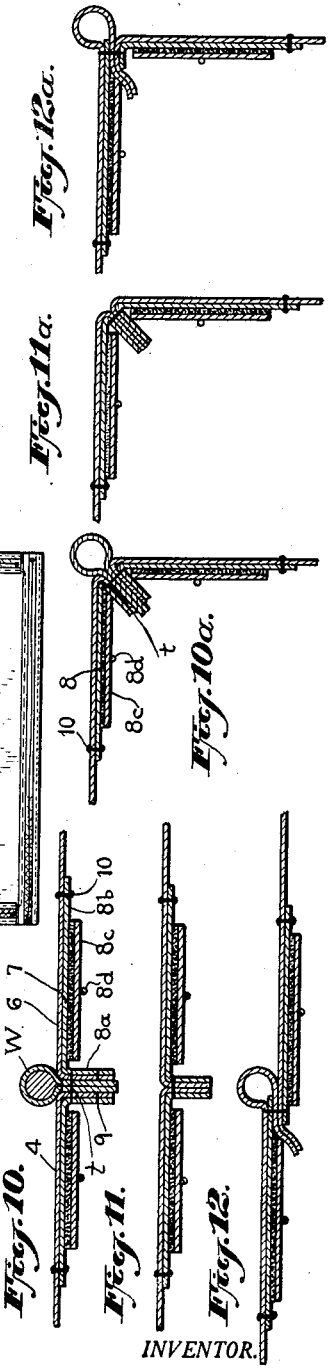

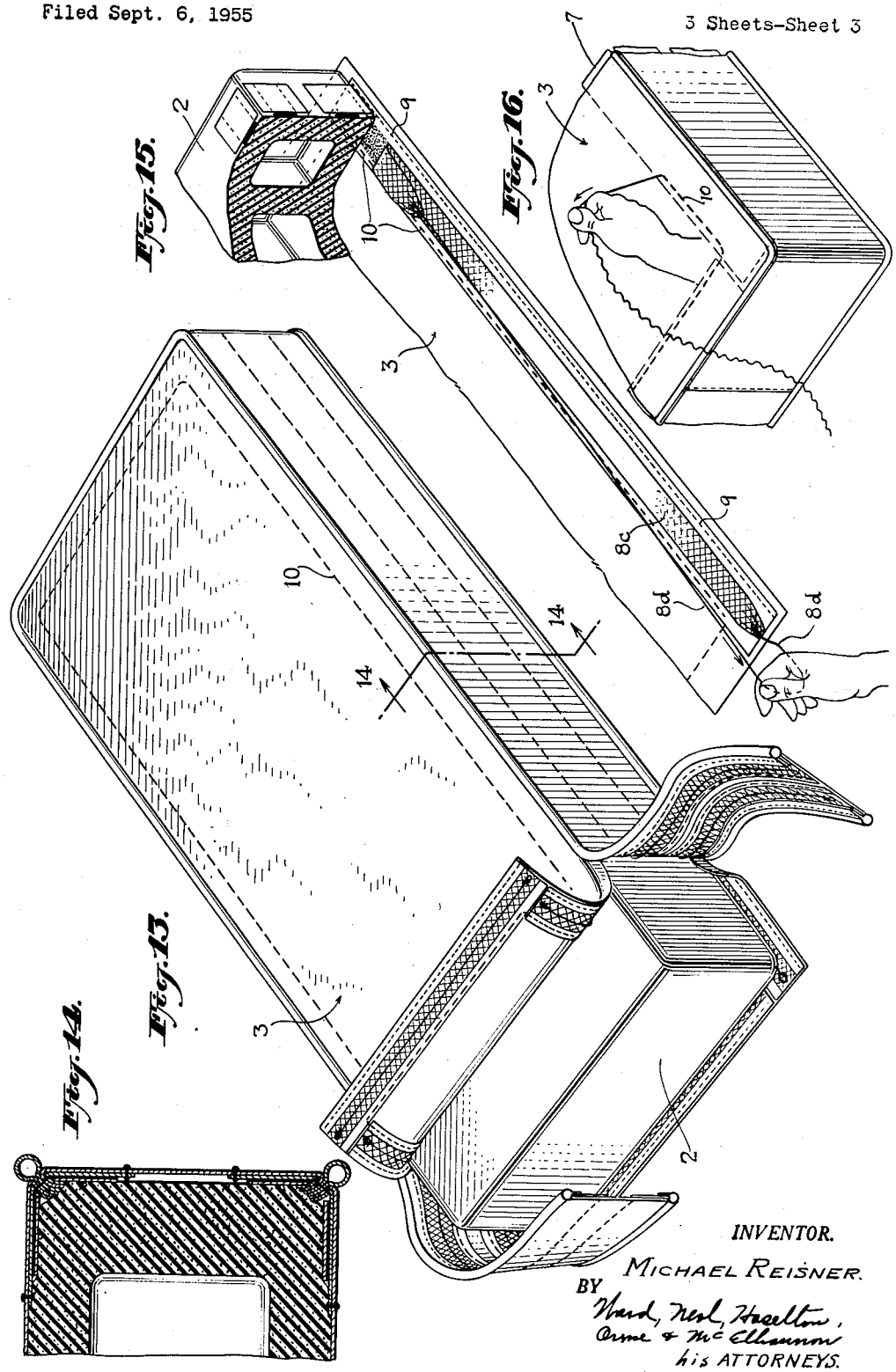
Nov. 20, 1956     M. REISNER     2,770,816
CUSHIONS AND METHOD OF MAKING THE SAME
Filed Sept. 6, 1955     3 Sheets-Sheet 3
INVENTOR.
MICHAEL REISNER.
his ATTORNEYS.

United States Patent Office 2,770,816
Patented Nov. 20, 1956

2,770,816
CUSHIONS AND METHOD OF MAKING THE SAME

Michael Reisner, Port Chester, N. Y.

Application September 6, 1955, Serial No. 532,434

9 Claims. (Cl. 5—355)

This invention relates to cushions and method of making the same; and more particularly to cushions comprising a resilient core made of foam rubber or other suitable elastomer material enclosed within a cover, such as fabric, wherein the cover is adhesively secured to the core.

It is known that in making cushions having a foam rubber core and a cover, a problem exists in securing the cover to the core in such manner that the cover will not creep with respect to the core. The prevention of creeping of the cover with respect to the core is especially important where a cushion is provided with surfaces meeting at well-defined edges, such for example as is found in mattresses, seat cushions for benches, chairs, etc. It has been proposed to secure the cover to the core by securing flaps to the interior of the cover, cementing these to the core; however, this is not feasible in the normal procedure where covers are made by sewing the various cover panels together to make an enclosure before inserting the core within an open mouth along one edge. Nor has this been found feasible where it is desired to have cover seams wherein the edges of the cover panels are stitched together while the cover is turned inside out, and especially where certain types of seams are desired.

In addition to the use of foam latex and the like rubber cores, it is contemplated that resilient cores suitable for cushions may be made from molded foam plastic. Accordingly, the term "foam elastomer core" will be understood as comprehending molded or otherwise formed cores whether made of natural rubber, synthetic rubber, or suitable plastic material.

An object of the invention is to provide a cushion having a foam elastomer core enclosed within a cover having edge seams and in which a cover is secured to the core adjacent a plurality of said edges.

Another object of the invention is to provide a cushion in which a cover is secured to a foam elastomer core along as many marginal edges as is desired.

Another object of the invention is to provide fabric covered foam elastomer cushions free from the difficulties above referred to, and to provide a method of making such cushions which lends itself to economical and efficient manufacture.

Another object of the invention is to provide an economical and expedient method of manufacturing cushions having a foam elastomer core and a fabric cover secured thereto.

Other objects and advantages of the invention will more fully appear from the following description and the examples set forth by way of illustration, taken in conjunction with the drawings which illustrate by way of example certain embodiments of the invention and in which:

Fig. 1 is a perspective view of a cushion illustrating an embodiment of the invention;

Fig. 2 is a sectional view in elevation taken at 2—2 of Fig. 1 showing a cover in position on the core;

Fig. 3 is a view showing a segment of the structure shown in Fig. 2 but with the cover moved outwardly from the core to more clearly illustrate certain details of the structure;

Fig. 4 is a sectional view in elevation taken at 4—4 of Fig. 1 showing a slight variation in the cover seam where the mouth of the casing is closed after insertion in the core of the otherwise finished cover;

Fig. 5 is a plan view illustrating an embodiment of a special tape which serves to adhesively secure the cover in position on the core;

Fig. 6 is a similar view showing a slightly modified form of tape, representing the preferred embodiment;

Fig. 7 is a plan view of the top panel of the cover with tapes such as shown in Fig. 6 secured on the underside thereof;

Fig. 8 is a view similar to Fig. 7 of the bottom face panel of the cover;

Fig. 9 is a similar view of the intermediate border panel of the cover, also viewed from the underside;

Figs. 10, 11 and 12 show respectively a self-welting seam, a plain seam, and a false, self-welting seam as illustrative of the types of seams which may be utilized in practicing the invention, the seams being shown as they appear when the connected panels are disposed in the same plane to clearly illustrate certain structural features;

Figs. 10a, 11a and 12a show the corresponding seams of Figs. 10, 11 and 12 as they appear with the cover in position on the core;

Fig. 13 is a perspective view of the device shown in Fig. 1 before the cover casing has been completely closed and with certain of the parts folded outwardly to better illustrate the interior structure;

Fig. 14 is a sectional view in elevation taken at 14—14 of Fig. 13.

Fig. 15 is a perspective view of a segment of the core and cover with the parts in inverted position to better illustrate a step in the method; and Fig. 16 is a perspective view of the lower right-hand corner of the structure shown in Fig. 13 after the mouth of the cover casing is closed and illustrates a subsequent step in the method.

Referring to the drawings and more particularly to Figs. 1–4 inclusive:

The cover cushion is designated in its entirety as 1 and comprises in general an elastomer core 2 in the form of molded foam rubber or the like material and a cover designated in its entirety as 3. The cover comprises a top face panel 4, a bottom face panel 5 and an intermediate or border panel 6. The top face panel 4 has its marginal edges 4e secured to the corresponding marginal edge 6e of the border panel 6 as by stitching thread t (Fig. 3). The form of seam here used is the self-welting seam as illustrated in Fig. 10 in which a welt member W is included. This stitched seam throughout at least three edges is completed entirely within the interior of the cover, as will best be seen in Fig. 3. Along one of the short edges (Fig. 4) the thread t' of the stitching is shown passing from the outside of the casing, illustrating one type of stitching suitable for closing the mouth of the cover casing after the core has been inserted. The marginal edges of the bottom face panel 5 are similarly secured to the corresponding marginal edge of the border panel 6 by a stitched seam, and if desired, this stitching may be entirely on the inside of the casing throughout the four sides or may be left open at the mouth and if it is desired to make the mouth the full depth of the end of the cushion.

In the embodiment shown in Figs. 1–4 inclusive, a structure is shown in which the cover is attached to the core closely adjacent to the stitched seams defining the perimeter of the top and bottom faces and on both sides of said seams, i. e., along eight edges of the cushion on each side of the seams, making in all sixteen zones of attachment. This embodiment gives the maximum fastening of the cover to the core and is beneficial in large cushions such as mattresses for beds, etc., or in other embodiments where maximum holding power is desired. The novel means of fastening the cover in position will now be described in detail.

Along opposite sides of each of said seam edges are disposed tapes such as 7 (Fig. 3). Said tapes are provided on one face with an adhesive coating such as 8 extending throughout the length of the tape and disposed along a central zone lying intermediate uncoated marginal zones 8a and 8b. The marginal edge 8a is secured to the stitched seam, as by the seam threads t which securely fastens the tape to the cover at the seam. The adhesive coating 8 adhesively fastens the tape to the core 2 and is of suitable material to effect this adhesion. The inwardly extending uncoated marginal edge 8b serves a purpose in the stages of manufacture to be later described in connection with the method of the invention. As will be best illustrated in Fig. 3, it will be seen that the opposite or outer face of the tape 7 is not coated with adhesive and substantially throughout the width of the tape from the stitched seam the tape is free of connection with the cover. This is an important feature of the invention, especially where the cover is fabric, since it presents a pleasing appearance of the cover while permitting the cover to be secured to the core. It will be understood that each of the sixteen strips of tape, or the tape along the sixteen edge zones is similarly formed and secured in position to both the cover and core.

In cushions of small sizes, it is oftentimes sufficient to utilize only two fastening tapes along opposite edges of one of the face panels. However, one of the important features of the invention is that as many fastening tapes along as many edges as desired may be utilized and regardless of how large the cushion is.

Method

The method of making the said cushion will now be described with more particular reference to Figs. 5–16.

One of the important elements which has been found useful in making said cushion is the provision of the special tape 7 (Fig. 5) having on one face the adhesive coating 8 extending lengthwise thereof intermediate the uncoated marginal edges 8a and 8b, as previously referred to. In carrying out the method of the invention the adhesive coating is covered with a masking strip 8c which is preferably made of a thin, readily pliable fabric such as is used on adhesive bandages to mask the adhesive coating. In small size cushions where access may be readily had to the various seam edges, or as to such edges where access may be readily had, this embodiment of the tape may be employed. However, I have found it extremely useful, and especially where the stitched seams are not readily accessible in practicing the method, to use the embodiment of the tape shown in Fig. 6 where in addition to the structure above described a pull or stripping string 8d is passed over the outside of the masking tape 8c and is secured thereto at its opposite ends as by stitching 8e.

A face panel such as the top panel 4 is positioned with it reverse side uppermost and tapes such as 7 are passed along the four marginal edges (Fig. 7) with the adhesive coated surfaces uppermost and with the outer edges of the tapes coinciding with the outer edges of the panel 4; each tape being stitched in position by rows of stitchting such as 9 and 10 passing through the uncoated marginal edges and through the panel 4. At least the innermost row of stitchting 10 must be a chain stitch whose releasing thread is disposed on the right side of the fabric. To facilitate production the row of stitching 9 may also be performed on the same chain stitching machine as employed for the chain stitch 10. Furthermore, to facilitate carrying out the method the chain stitch 10 is preferably continuous around the four tapes corresponding to the four edges of the panel. The bottom face panel 5 is similarly supplied with tapes such as 7 secured on the reverse side of the fabric in the manner above pointed out and to distinguish the similar parts in the two figures, those in Fig. 8 have been given the same numerals with the prime suffix added. The border panel 6 (Fig. 9) is supplied with similar tapes designated 7″ secured along the opposite longitudinal edges only in a manner similar to that above described with reference to Fig. 7 where in this instance for purposes of convenience the draw-string has been applied to the masking tape in two lengths.

After the fabric panels have been prepared as above described, the marginal edges of the top panel 4 and bottom panel 5 are secured by stitched seams to the respectively corresponding upper and lower edges of the border panel 6 so as to form a cover casing in which the reverse side of the fabric panels are outermost, leaving the mouth open at one end of the casing. This mouth opening is preferably disposed along one of the narrow sides and may either be disposed along only one edge seam or if desired a larger mouth opening may be left, all of which will be understood by those skilled in the art. In the present embodiment the stitched seams on the form illustrated in Fig. 10 show that the stitching thread t passes through the uncoated marginal zone 8a serving to secure it to the adjacent marginal edge of a cover panel. At this stage of the operation the chain stitches such as 10 serve to secure the opposite uncoated marginal edge 8b against the reverse side of the fabric so as to hold the tapes such as 7 in position. If desired one or the other forms of seams illustrated in Figs. 11–12 may be employed. It is noted that in all of these three forms of seams at least one of the stitched edges is disposed within the cover and the stitching passes therethrough and extends interiorly of the cover.

After the casing has been completed it is turned so that the fabric is right side out, at which time the seam assumes the positioned indicated in Fig. 10a, or if the alternative forms of seam are employed they assume the respective positions indicated in Figs. 11a and 12a.

After the casing has been turned so that the right side of the fabric is outermost, the core 2 is inserted through the open mouth in the position indicated in Fig. 13, it being noted that the parts adjacent the mouth have been removed from their normal position to better illustrate the interior structural arrangement. The cover is adjusted so that the edge seams of the cover are in proper register on the edges of the core; with the cover arranged in the desired position of alignment the operator successively engages the pull cord 8d secured to the respective masking tapes 8c and by pulling the cord the masking tape is stripped from the adhesive coating so as to expose the adhesive coating next to the core. During this operation the cushion is preferably disposed with the cover panel, from which the masking tape is to be removed, disposed above the core, so as to relieve the stripping operation from the weight of the core. In Fig. 15 this desired position has been reversed to better illustrate the action of stripping the mask 8c from the adhesive coating of the tape.

After all of the masking strips such as 8c are stripped from the adhesive coatings, the mouth of the cover casing is sewed together so as to finish the sewn cover. An example of a suitable stitch for closing the mouth is illustrated in Fig. 4.

After the mouth is closed, the edges of the cover are again examined as to proper alignment with the corresponding edges of the core and if further adjustment is necessary this still may be done since the tapes are sewed at its inner uncoated marginal edges to the fabric; therefore by lifting the fabric such adhesion as has been effected between the adhesive coating and the core may be loosened until the cover is reset accurately in the desired position and pressure is exerted against the outside of the cover immediately over the tapes so as to force the adhesive coating of the tapes into intimate engagement with the core.

The final step in the operation is to open the chain stitches 10 on the cover (Fig. 16).

As above described the cover will then be secured to the tape along the marginal uncoated edge of the tapes at the seam and the outer face of the tapes throughout their remaining width will be free from engagement with the overlying portions of the cover.

In large cushions, such as mattresses, the pull strings which may not be readily accessible at the mouth of the casing, such as at the opposite end of the cushion, may be engaged with a hook, or suitable means may be employed for exerting a pulling on the string to strip the tape.

It will be appreciated from the foregoing that by following the above procedure the core may be readily inserted in the cover of the casing through the mouth thereof without interference from the adhesive coating on the tapes, due to the protective masking tapes employed; and that only after the core is in position are the masking tapes removed, and even at such time the final adjustment may be effected until the final operation when the chain stitches are open.

Having thus described my invention with particularity, with reference to the preferred embodiment of the same, and having referred to certain modifications thereof, it will be obvious to those skilled in the art, after understanding my invention, that other changes and modifications may be made therein without departing from the spirit or scope of the invention and I aim in the appended claims to cover such changes and modifications as are within the scope of the invention.

What I claim is:

1. A cushion having a foam elastomer core enclosed within a fabric cover, said cover comprising top and bottom face panels and an intermeditae border panel, edges of said face panels and correspondingly adjacent edges of said border panel being secured together by stitched seams, at least one of said stitched edges of said seams around at least three sides of said cover being disposed within said cover and the stitching passing therethrough to the interior of said cover, a pair of tapes disposed within said cover adjacent a pair of opposite edge seams of one of said face panels respectively, said tapes each having an inner face adhesively secured to said core and an outermost marginal edge stitched to a panel edge of the respectively adjacent seam, the outer faces of said tapes throughout their extent inwardly from said adjacent edge seams being free of attachment to said cover.

2. A cushion having a foam elastomer core enclosed within a cover, said cover comprising top and bottom face panels and an intermediate border panel, the edges of said face panels and correspondingly adjacent edges of said border panel being secured together by stitched seams, at least one of said stitched edges of said seams being disposed within said cover on three sides of said cushion and the stitching passing through to the interior of said cover, from two to sixteen of said stitched seams being provided with a corresponding tape disposed within said cover, the inner face of each said tape having an adhesive coating extending lengthwise thereof intermediate uncoated marginal edge zones, one said marginal uncoated edge zone being secured to a panel edge of its cooperating seam by stitching, each said tape being adhesively secured to said core by said adhesive coating, and the outer face of each said tape throughout its extent inwardly from its cooperating stitched seam being free of attachment to said cover.

3. A cushion having a foam elastomer core enclosed within a cover, said cover comprising top and bottom face panels and an intermediate border panel, the edges of said face panels and correspondingly adjacent edges of said border panel being secured together by stitched seams, said stitched edges of said seams along three sides of each of said face panels being disposed within said cover on three sides of said cushion and the stitching passing through to the interior of said cover, from two to sixteen of said stitched seams being provided with a corresponding tape disposed within said cover, the inner face of each said tape having an adhesive coating extending lengthwise thereof intermediate uncoated marginal edge zones, one said marginal uncoated edge zone being secured to a panel edge of its cooperating seam by stitching, each said tape being adhesively secured to said core by said adhesive coating, and the outer face of each said tape throughout its extent inwardly from its cooperating stitched seam being free of attachment to said cover.

4. A cushion having a foam elastomer core enclosed within a cover, said cover comprising top and bottom face panels and an intermediate border panel, the edges of said face panels and correspondingly adjacent edges of said border panel being secured together by stitched seams, said stitched edges of said seams being disposed within said cover, from two to sixteen of said stitched seams being provided with a corresponding tape disposed within said cover, the inner face of each said tape having an adhesive coating extending lengthwise thereof intermediate uncoated marginal edge zones, one said marginal uncoated edge zone being secured to a panel edge of its cooperating seam by stitching, each said tape being adhesively secured to said core by said adhesive coating, and the outer face of each said tape throughout its extent inwardly from adjacent its cooperating stitched seam being free of attachment to said cover.

5. The method of making a cushion having a foam elastomer core and a fabric cover which comprises providing a plurality of fastening tape each having on one face an adhesive coating extending lengthwise thereof intermediate uncoated marginal edge zones and provided with a mask covering said adhesive, stitching an uncoated marginal edge zone of each said tape at a respectively adjacent seam connecting an edge of a face panel to a corresponding edge of the border panel of said cover by stitching passing through at least one of said cover edges and releasably securing the opposite uncoated marginal edge of said tape to the inner face of said fabric cover, said tape being positioned with its masked adhesive coating facing inwardly of said cover, thereafter inserting the core within the cover casing through an open mouth of said casing with the edge seams of the cover aligned with the corresponding edges of the core, detaching the masking strip so as to expose the adhesive coating on the tape and pressing the tape into intimate engagement with the core so as to adhesively secure the tape to the core, detaching the innermost marginal uncoated edge of the tape from the cover and closing the mouth of the cover through which the core has been inserted.

6. The method of making a cushion having a foam elastomer core and a fabric cover which comprises providing a plurality of fastening tapes each having on one face an adhesive coating extending lengthwise thereof intermediate uncoated marginal edge zones and provided with a mask covering said adhesive, stitching an uncoated marginal edge zone of each said tape at a respectively adjacent seam connecting an edge of a face panel to a corresponding edge of the border panel of said cover by stitching passing through a cover edge and releasably securing the opposite uncoated marginal edge of said tape to the inner face of said fabric cover by a chain stitch whose releasing thread is on the outer face of the cover, said tape being positioned with its masked adhesive coating facing inwardly of said cover, inserting the core within the cover casing with the edge seams of the cover aligned with the corresponding edges of the core, detaching the masking strip so as to expose the adhesive coating on the tape and pressing the tape in intimate engagement with the core so as to adhesively secure the tape to the core, closing the end of the cover casing through which the core has been inserted and thereafter detaching the innermost marginal uncoated edges of the tape from the cover by pulling said releasing thread.

7. The method of making a cushion having a foam elastomer core and a fabric cover consisting of a plurality of face panels and a border panel which comprises providing a plurality of fastening tapes each having on one face an adhesive coating extending lengthwise thereof intermediate uncoated marginal edge zones and provided with a mask covering said adhesive, stitching an uncoated marginal edge zone of each of said tapes to correspondingly opposite edges of a face panel on the inner face of said panel, said tapes being positioned with their adhesive coating facing away from the inner face of said panel, sewing the opposite uncoated marginal edge zones of said tapes to said face panel with chain stitches whose releasing thread is on the outside of said panels; thereafter sewing the marginal edges of said face panels to corresponding edges of the border panel along three sides of said cover while said panels are disposed inside-out, turning said cover right-side out, inserting the core within the cover casing through its open mouth, aligning the edge seams of the cover with the corresponding edges of the core, detaching the masking strip so as to expose the adhesive coating on the tape facing the core and pressing the tape into intimate engagement with the core so as to adhesively secure the tape to the core, closing the end of the cover casing through which the core has been inserted and thereafter opening the chain stitches to thereby detach the innermost marginal uncoated edge of the tape from the cover.

8. The method of making a cushion having a foam elastomer core and a fabric cover consisting of a plurality of face panels and a border panel which comprises providing a plurality of fastening tapes each having on one face an adhesive coating extending lengthwise thereof intermediate uncoated marginal edge zones and provided with a mask covering said adhesive, stitching an uncoated marginal edge zone of each of said tapes to a cooperating edge of a panel on the inner face of said panel, said tapes being positioned with their adhesive coating facing away from the inner face of said panel, sewing the opposite uncoated marginal edge zones of each said tape to said panel with chain stitches whose releasing thread is on the outside of said panel; thereafter sewing the marginal edges of said face panels to corresponding edges of the border panel along three sides of said cover while said panels are disposed inside-out, turning said cover right-side out, inserting the core within the cover casing through its open mouth, aligning the edge seams of the cover with the corresponding edges of the core, detaching the masking strip so as to expose the adhesive coating on the tape facing the core and pressing the tape into intimate engagement with the core so as to adhesively secure the tape to the core, closing the end of the cover casing through which the core has been inserted and thereafter opening the chain stitches to thereby detach the innermost marginal uncoated edge of the tape from the cover.

9. The method of securing a cover to a foam elastomer core which comprises permanently securing to a plurality of edge seams of said cover a marginal edge of each of a plurality of fastening tapes disposed interiorly of said cover and provided with inwardly disposed adhesive faces covered with masking tapes, said masking tapes each being provided along its exposed face with a pull string secured at its opposite ends adjacent the opposite ends of said tape, inserting said core within said cover through an open mouth thereof and aligning the cover edge seams with the corresponding core edges, stripping off said masking tapes by means of said pull strings to thereby expose said adhesive surfaces of said tapes, pressing said exposed adhesive surfaces into adhesive engagement with said core and thereafter closing the mouth of said cover.

References Cited in the file of this patent

UNITED STATES PATENTS

| | | |
|---|---|---|
| 2,030,135 | Carpenter | Feb. 11, 1936 |
| 2,105,997 | Church | Jan. 18, 1938 |
| 2,193,410 | Schubert | Mar. 12, 1940 |
| 2,326,441 | Cunningham | Aug. 10, 1943 |